United States Patent
Yoon

(10) Patent No.: US 10,735,696 B1
(45) Date of Patent: Aug. 4, 2020

(54) BACKUP DOORBELL COMMUNICATION SYSTEM AND METHOD

(71) Applicant: AMAZON TECHNOLOGIES, INC., Seattle, WA (US)

(72) Inventor: Joshua Hongpyo Yoon, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/178,509

(22) Filed: Nov. 1, 2018

(51) Int. Cl.
*H04N 7/18* (2006.01)
*H04N 7/14* (2006.01)
*H04W 84/12* (2009.01)

(52) U.S. Cl.
CPC ............. *H04N 7/186* (2013.01); *H04N 7/147* (2013.01); *H04W 84/12* (2013.01)

(58) Field of Classification Search
USPC ....................................................... 348/14.02
See application file for complete search history.

(56) References Cited

U.S. PATENT DOCUMENTS

| | | | |
|---|---|---|---|
| 4,764,953 A | 8/1988 | Chern et al. |
| 5,428,388 A | 6/1995 | Von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |

(Continued)

FOREIGN PATENT DOCUMENTS

| CN | 2585521 Y | 11/2003 |
|---|---|---|
| CN | 2792061 Y | 6/2006 |

(Continued)

OTHER PUBLICATIONS

U.S. Appl. No. 16/183,462 Office Action dated Jun. 21, 2019, 9 pages.

(Continued)

*Primary Examiner* — Amal S Zenati
(74) *Attorney, Agent, or Firm* — Lathrop GPM LLP

(57) ABSTRACT

A backup communication system and method provides communicating between a video doorbell and a doorbell sound output device when communication between the video doorbell and a remote server us unavailable. When a front button of the video doorbell is pressed or motion is detected in front of the video doorbell, the video doorbell attempts to send a message to the remote server via a wireless local area network (WLAN). The video doorbell determines when the message is not received by the remote server, such as when the WLAN is not connected to the internet and/or the remote server does not acknowledge the message, and sends, via the WLAN, a broadcast message to the doorbell sound output device. The doorbell sound output device detects the broadcast message from the video doorbell and generates the audio tone.

18 Claims, 12 Drawing Sheets

(56) References Cited

U.S. PATENT DOCUMENTS

| | | | |
|---|---|---|---|
| 7,062,291 B2 | 6/2006 | Ryley et al. | |
| 7,065,196 B2 | 6/2006 | Lee | |
| 7,085,361 B2 * | 8/2006 | Thomas | H04M 3/533 379/167.01 |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 * | 3/2010 | Oh | H04M 3/42348 348/14.01 |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 * | 3/2012 | Carter | H04N 7/142 348/14.06 |
| 8,154,581 B2 | 4/2012 | Carter | |
| 8,619,136 B2 | 12/2013 | Howarter et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 * | 11/2015 | Scalisi | G08B 7/064 |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2010/0191608 A1 * | 7/2010 | Mikkelsen | G06Q 30/0601 705/26.1 |
| 2010/0225455 A1 | 9/2010 | Claiborne et al. | |
| 2013/0057695 A1 | 3/2013 | Huisking | |
| 2014/0267716 A1 | 9/2014 | Child et al. | |
| 2015/0035987 A1 * | 2/2015 | Fernandez | H04N 7/186 348/156 |
| 2015/0109111 A1 | 4/2015 | Lee et al. | |
| 2015/0163463 A1 | 6/2015 | Hwang et al. | |
| 2016/0227474 A1 | 8/2016 | McRae | |
| 2018/0103238 A1 | 4/2018 | Wu et al. | |
| 2018/0365969 A1 | 12/2018 | Krein et al. | |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

OTHER PUBLICATIONS

U.S. Appl. No. 16/183,462 Notice of Allowance dated Nov. 12, 2019, 5 pages.

* cited by examiner

BACKUP DOORBELL COMMUNICATION SYSTEM AND METHOD

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present backup doorbell communication system and method now will be discussed in detail with an emphasis on highlighting the advantageous features. These embodiments depict the novel and non-obvious backup doorbell communication system and method shown in the accompanying drawings, which are for illustrative purposes only. These drawings include the following figures, in which like numerals indicate like parts.

DETAILED DESCRIPTION

Figure 1A:
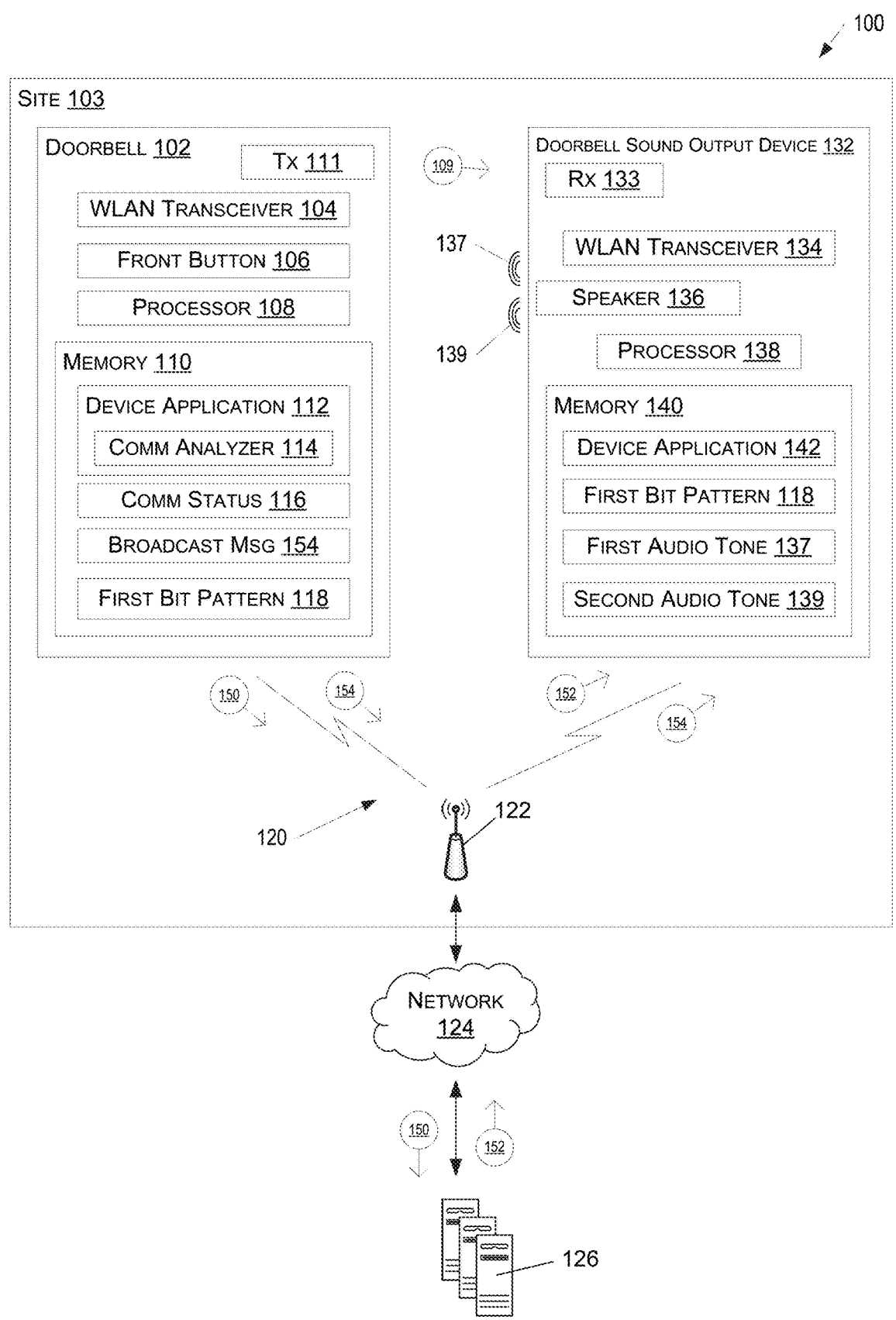
FIG. 1A is a functional block diagram of an example backup doorbell communication system, according to various aspects of the present disclosure.

A video doorbell, or any other type of smart doorbell, may be positioned at an entrance of a premises and be communicatively connected to a remote server via a local area network (LAN) operating at the premises. For example, the video doorbell may include a front button that may be pressed by a visitor requesting attention at the premises. The LAN (e.g., a Wi-Fi network implemented by a router and a wireless hub) may connect to the Internet, via an Internet Service Provider (ISP). The remote server may also connect to the Internet, and the video doorbell may communicate with the remote server via the LAN and the Internet, for example. When the visitor presses the front button of the video doorbell, the video doorbell sends a message indicating pressing of the front button to the remote server, which in turn sends a message instructing output of a tone, to a doorbell sound output device, which may also be located at the premises. Upon receiving the message instructing output of the tone, the doorbell sound output device emits the tone to indicate presence of the visitor at the video doorbell.

In another configuration, the video doorbell may communicate the message directly from the video doorbell to the doorbell sound output device. However, it is advantageous to route the message from the video doorbell to the remote server, and then to the sound output device, as described above. In particular, the doorbell sound output device may be installed after the video doorbell, and thus the routing of the message from the video doorbell to the remote server advantageously simplifies later installation of the doorbell sound output device. That is, when the doorbell sound output device is installed, the remote server is already configured to control the doorbell sound output device, and needs no further modification other than to update a data structure accessible to the remote server to indicate the association between the video doorbell and the newly installed doorbell sound output device. Further, it is easier for an authorized user to interact with the remote server to configure desired operation of the doorbell sound output device, and this aspect in turn makes it easier for the remote server to use the configuration to control the doorbell sound output device.

When communication between the video doorbell and the remote server and/or communication between the remote server and the doorbell sound output device is not possible, presence of the visitor pressing the front button of the video doorbell may not be announced by the doorbell sound output device. For example, even though the LAN remains operational, connectivity between the LAN and the Internet may have failed and/or the remote server may be offline. When the remote server is offline or does not receive the message from the video doorbell because the connection to the Internet is unavailable, the remote server cannot generate and send the message instructing the doorbell sound output device to generate a tone, and the visitor waits at the video doorbell unannounced.

The present embodiments solve this problem by determining when the message from the video doorbell cannot be sent to the remote server, and then the video doorbell sending, via the LAN, a broadcast message that may be detected by the doorbell sound output device. When the doorbell sound output device detects the broadcast message, the doorbell sound output device generates the tone to indicate presence of the visitor at the video doorbell. In certain embodiments, the doorbell sound output device may generate two different tones, a first tone when the message is received from the remote server and a second tone when the broadcast message from the video doorbell is detected. Thus, a user hearing the second tone is made aware that communication between the video doorbell and the remote server is unavailable. Advantageously, the user is still made aware of the visitor at the video doorbell even when communication with the remote server is unavailable.

The remaining detailed description describes the present embodiments with reference to the drawings. In the drawings, reference numbers label elements of the present embodiments. These reference numbers are reproduced below in connection with the discussion of the corresponding drawing features.

One aspect of the present embodiments includes the realization that a video doorbell operationally communicates with a remote server, and therefore when the remote server is unavailable a doorbell sound output device may not generate a sound when a visitor presses a front button of the video doorbell. The present embodiments solve this problem by detecting, with the video doorbell, when communication between the video doorbell and the remote server is unavailable, and by providing a backup doorbell communication system and method that allows the video doorbell to indicate to the doorbell sound output device, via a local area network, that there is a visitor at the video doorbell, such that the doorbell sound output device still generates a tone to indicate the presence of the visitor. Advantageously, the present backup doorbell communication system and method further improves reliability of the video doorbell and the doorbell sound output device.

Another aspect of the present embodiments includes the realization that a user may be unaware when communication between the video doorbell and the remote server is unavailable. The present embodiments solve this problem by causing the doorbell sound output device to generate two different tones: a first tone when a message is received from the remote server to indicate the presence of the visitor at the video doorbell, and a second tone, different from the first tone, when an indication of the visitor at the video doorbell is received via the backup doorbell communication system. Advantageously, when the user hears the second tone, the user becomes aware of the visitor at the video doorbell and also becomes aware that communication between the video doorbell and the remote server is unavailable.

In a first aspect, a backup doorbell communication method communicates between a video doorbell and a doorbell sound output device when communication between the video doorbell and a remote server fails. The method includes detecting that a front button of the video doorbell has been pressed and, in response to the detecting, attempting to send a message to the remote server via a wireless local area network (WLAN). The method determines that the message was not received by the remote server and sends, via the WLAN, a packet to the doorbell sound output device. The packet is identifiable as being from the video doorbell and includes an instruction to play an audio tone. The method generates the audio tone, by the doorbell sound output device.

Certain embodiments of the first aspect further include determining that the message was not received by the remote server because the WLAN is not connected to the Internet.

Certain embodiments of the first aspect further include determining that the message was not received by the remote server because no acknowledgement was received from the remote server.

In a second aspect, a backup doorbell communication method includes detecting a button press at a video doorbell, determining that communication between the video doorbell and a remote server via a wireless local area network (WLAN) is unavailable, and sending a broadcast message via the WLAN to a sound output device connected to the WLAN.

In certain embodiments of the second aspect, detecting the button press includes detecting operation of a switch indicating that a front button of the video doorbell has been pressed. The broadcast message includes an instruction to the sound output device to emit sound indicating that the front button of the video doorbell has been pressed.

In certain embodiments of the second aspect, the broadcast message further includes an instruction to the sound output device to emit sound indicating communication between the video doorbell and a remote server is unavailable.

In certain embodiments of the second aspect, the broadcast message is broadcast via the WLAN and not specifically addressed to the sound output device.

Certain embodiments of the second aspect further include sending, in response to detecting the button press, a message to the remote server via the WLAN, determining that a response to the message is not received from the remote server, and determining that the communication between the video doorbell and the remote server via the WLAN is unavailable because the response to the message is not received from the remote server.

Certain embodiments of the second aspect further include determining that the WLAN is not connected to the Internet, and determining that the communication between the video doorbell and the remote server via the WLAN is unavailable because the WLAN is not connected to the Internet.

In a third aspect, a backup doorbell communication method includes detecting motion of an object in front of a video doorbell, determining that communication between the video doorbell and a remote server via a wireless local area network (WLAN) is unavailable, and sending a broadcast message via the WLAN to a sound output device connected to the WLAN.

In certain embodiments of the third aspect, the broadcast message includes an instruction to the sound output device to emit sound indicating movement of the object at the video doorbell.

In certain embodiments of the third aspect, the motion is detected by a motion detector of the video doorbell.

In certain embodiments of the third aspect, detecting the motion includes processing images from a camera of the video doorbell.

In certain embodiments of the third aspect, detecting the motion includes processing infrared signals from a pyroelectric infrared detector of the video doorbell.

In a fourth aspect, a doorbell includes a processor, a wireless local area network (WLAN) transceiver communicatively coupled with the processor, at least one detector communicatively coupled with the processor, and a memory, communicatively coupled with the processor, storing machine readable instructions that, when executed by the processor, control the doorbell to: receive a signal indicating input detected by the at least one detector, determine when communication between the doorbell and a remote server via the WLAN transceiver is unavailable, and broadcast a message, identifiable by a sound output device, via the WLAN transceiver over a WLAN.

In certain embodiments of the fourth aspect, the message is broadcast over the WLAN and not specifically addressed to the sound output device.

In certain embodiments of the fourth aspect, the at least one detector includes one or more of a switch configured to close when a front button of the doorbell is pressed, a pyroelectric infrared detector configured to generate an output signal processable by the processor to determine the motion in front of the doorbell, and a camera configured to capture images processable by the processor to determine the motion in front of the doorbell.

In certain embodiments of the fourth aspect, the message directs the sound output device to generate a sound to indicate one or both of (a) that the front button of the doorbell has been pressed, and (b) that the motion is detected in front of the doorbell.

In certain embodiments of the fourth aspect, the memory further includes machine readable instructions stored in the memory that, when executed by the processor, control the doorbell to: send a message to the remote server via the WLAN transceiver to indicate one or both of (a) that the front button of the doorbell has been pressed, and (b) that the motion is detected in front of the doorbell, determine that a response to the message is not received from the remote server, and determine that the communication between the doorbell and the remote server is unavailable because the response is not received.

Certain embodiments of the fourth aspect further include machine readable instructions stored in the memory that, when executed by the processor, control the doorbell to determine that the WLAN is not connected to the Internet, and determine that the communication between the doorbell and the remote server is unavailable because the WLAN is not connected to the Internet.

In a fifth aspect, a doorbell sound output device has backup communication and includes a processor, a sound generator communicatively coupled with the processor, a wireless local area network (WLAN) transceiver communicatively coupled with the processor, and a memory communicatively coupled with the processor and storing machine readable instructions that, when executed by the processor, control the processor to: receive a broadcast message via the WLAN transceiver, determine that the broadcast message is a message from a doorbell, and control the sound generator to generate a first sound to indicate activity at the doorbell in response to the message.

In certain embodiments of the fifth aspect, the first sound is different from a second sound generated when a message indicating activity at the doorbell is received from a remote server, the first sound indicating a communication failure between the remote server and the doorbell.

Certain embodiments of the fifth aspect further include machine readable instructions stored in the memory that, when executed by the processor, control the doorbell sound output device to determine that the broadcast message is the message from the doorbell when at least part of the broadcast message matches a bit pattern configured within the memory of the doorbell sound output device.

FIG. 1A is a schematic diagram of a doorbell 102 with a backup doorbell communication system 100, according to various aspects of the present disclosure. The doorbell 102 is for example a video doorbell (e.g., a doorbell that includes video and audio communication capability) that communicates with a remote server 126 to announce the presence of a visitor at the doorbell 102 by controlling a doorbell sound output device 132 to generate an audio tone. A user may place one or more of the doorbell sound output device(s) 132 at different locations within and/or external to a site 103 (e.g., a home) to ensure that the doorbell sound can be heard.

The doorbell 102 includes a WLAN transceiver 104, a front button 106, a processor 108 communicatively coupled with a memory 110 storing a device application 112 and a communication status 116. The device application 112 may include machine readable instructions that, when executed by the processor 108, control the processor 108 to implement the functionality of certain embodiments described herein.

In the example of FIG. 1A, the doorbell 102 is located at the site 103 that also has a wireless LAN (WLAN) 120, formed by a wireless hub 122 for example. The WLAN 120 enables the doorbell 102 to communicate with the remote server 126 via a network 124 (e.g., the Internet). The doorbell sound output device 132 may include additional functionality, such as a range extender that extends the range of the WLAN 120, without departing from the scope hereof. The remote server 126 may be implemented as one or more of a cloud-based server, multiple networked servers, and so on. Similarly, the WLAN 120 and the network 124 may allow the remote server 126 to communicate with the doorbell sound output device 132. The doorbell sound output device 132 may include a WLAN transceiver 134, a speaker 136, and a processor 138 communicatively coupled with a memory 140. The memory 140 may include a device application 142 with machine readable instructions that, when executed by the processor 138, control the processor 138 to implement functionality of the doorbell sound output device 132 according to the embodiments described herein.

In one example of operation, when communication between the remote server 126 and each of the doorbell 102 and the doorbell sound output device 132 is available, the device application 112 determines that the front button 106 is pressed by a visitor and generates and sends a message 150 to the remote server 126 via the WLAN 120 and the network 124. In response to the message 150, the remote server 126 generates and sends, via the network 124 and the WLAN 120, a message 152 to the doorbell sound output device 132. In response to the message 152, the device application 142 of the doorbell sound output device 132 controls the speaker 136 to generate a first audio tone 137 to indicate the presence of the visitor at the doorbell 102.

The device application 112 may include a communication analyzer 114 that monitors communication between the doorbell 102 and the remote server 126 and sets a communication status 116 accordingly. For example, the communication analyzer 114 may be invoked by the device application 112 when the message 150 is sent to the remote server 126. When the communication analyzer 114 determines that the remote server 126 has not acknowledged the message 150, the communication analyzer 114 may set the communication status 116 to indicate that communication between the doorbell 102 and the remote server 126 is unavailable. The communication analyzer 114 may also interact with the WLAN 120 and/or the wireless hub 122 to determine whether the WLAN 120 is connected to the network 124 (e.g., the Internet), setting the communication status 116 accordingly. For example, the wireless hub 122 (or the associated router) may indicate that the WLAN 120 is not connected to an ISP (and therefore cannot connect to the network 124 and the Internet). The wireless hub 122 may then set the communication status 116 to indicate that communication with the remote server 126 is unavailable.

When communication with the remote server 126 is unavailable, as indicated by the communication status 116, the communication analyzer 114 may generate and send, via the WLAN 120, a broadcast message 154 (e.g., a special packet). The broadcast message 154 may be broadcast over the WLAN 120, and may not be specifically addressed to the doorbell sound output device 132; however, the broadcast message 154 may be generated to include a predefined first bit pattern 118, shown stored in the memory 110 of the doorbell 102 and also stored in the memory 140 of the doorbell sound output device 132, such that the device application 142 of the doorbell sound output device 132 may recognize the broadcast message 154 when broadcast by the WLAN 120.

The first bit pattern 118 may further instruct the doorbell sound output device 132 to generate the first audio tone 137. Thus, when the broadcast message 154 is received by the doorbell sound output device 132 and matched to the first bit pattern 118, the device application 142 controls the speaker 136 to generate the first audio tone 137. Advantageously, the first audio tone 137 is generated by the doorbell sound output device 132 to announce the presence of the visitor at the doorbell 102 even when communication between the doorbell 102 and the remote server 126 is unavailable.

In certain embodiments, in response to receiving the broadcast message 154 and matching the first bit pattern 118, the device application 142 may control the speaker 136 to generate a second audio tone 139 that is different from the first audio tone 137. That is, the first bit pattern 118 may instruct the doorbell sound output device 132 to generate the second audio tone 139. Accordingly, the doorbell sound output device 132 generates the first audio tone 137 in response to receiving the message 152 from the remote server 126, and generates the second audio tone 139 in response to receiving the broadcast message 154 and matching the first bit pattern 118. In one example, the first audio tone 137 may be a "ding-dong" sound and the second audio tone may be a "dong-ding" sound. Thus, when the user hears the "dong-ding" sound, the user is made aware that the visitor is at the doorbell 102, and is also made aware that communication between the doorbell 102 and the remote server 126 is unavailable. Advantageously, this indication may allow the user to investigate a cause of the communication unavailability and to initiate remediation when appropriate. In certain embodiments, the first and second audio tones 137, 139 may be stored as digital audio in the memory 140 and played thorough the speaker 136 by the device application 142.

Figure 1B:
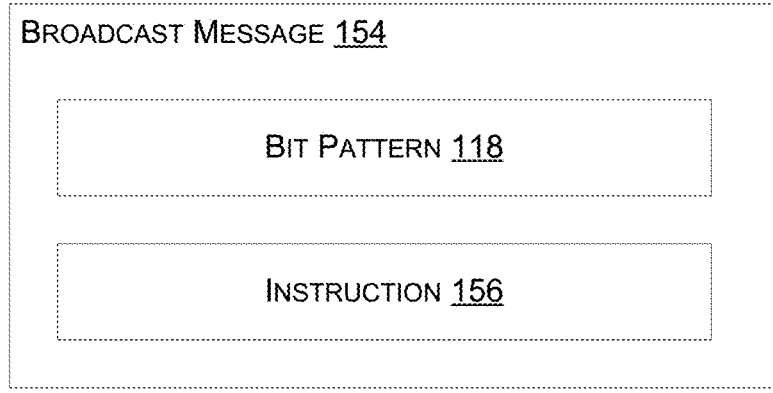
FIG. 1B is a functional block diagram of the broadcast message of FIG. 1A, according to various aspects of the present disclosure.

FIG. 1B shows the broadcast message 154 of FIG. 1A further including an instruction 156, in an embodiment. The instruction 156 may be set by the device application 112 of the doorbell 102 to control which of the first and second audio tones 137, 139 is generated by the doorbell sound output device 132. In one example, when the instruction 156 has a value of zero, the device application 142 controls the speaker 136 to generate the first audio tone 137, and when the instruction 156 has a value of one, the device application 142 controls the speaker to generate the second audio tone 139. In another example, when the instruction 156 has a value of one, the device application 142 controls the speaker to generate the first audio tone 137, and when the instruction 156 has a value of zero, the device application 142 controls the speaker to generate the second audio tone 139.

Figure 1D:
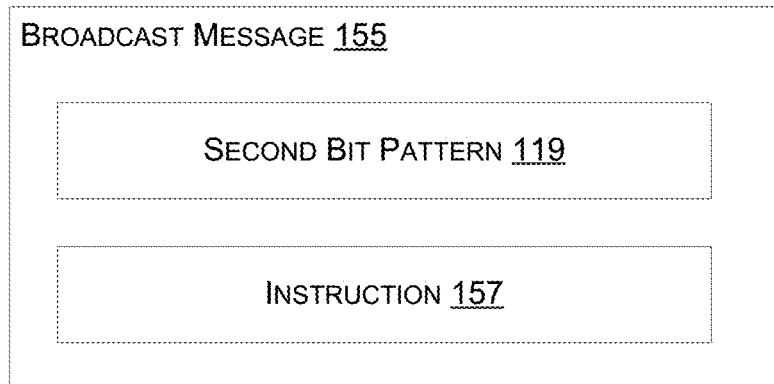
FIG. 1D is a functional block diagram of the broadcast message of FIG. 1C, according to various aspects of the present disclosure.
Figure 1C:
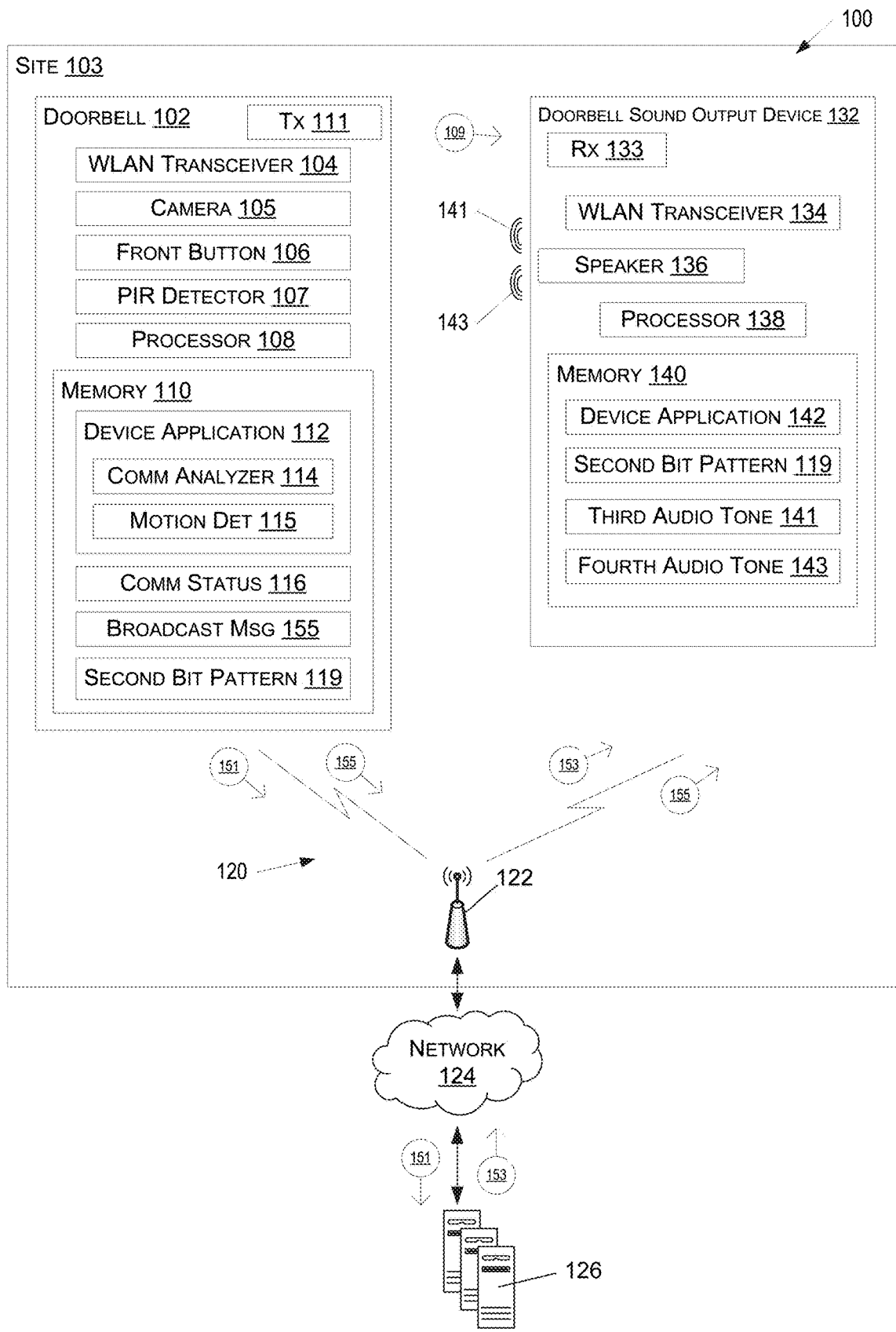
FIG. 1C is a functional block diagram of another example backup doorbell communication system, according to various aspects of the present disclosure.

FIG. 1C shows the doorbell 102 of FIG. 1A further configured with a camera 105, a pyroelectric infrared (PIR) detector 107, and a motion detector 115. The camera 105 may be positioned to have a field-of-view in front of the doorbell 102 and may thereby capture images of objects positioned in front of the doorbell 102. The PIR detector 107 may be positioned to detect infrared radiation from objects in front of the doorbell 102. The motion detector 115 may be stored in the memory 110 (e.g., as part of the device application 112) and include machine readable instructions that, when executed by the processor 108, control the processor 108 to detect motion in front of the doorbell 102 using one or both of the camera 105 and the PIR detector 107. In certain embodiments, the motion detector 115 may detect motion in images captured by the camera 105. In certain embodiments, the motion detector 115 may detect changes in IR radiation detected by the PIR detector 107 as indicating motion in front of the doorbell 102.

When motion is detected using one or both of the camera 105 and the PIR detector 107, the motion detector 115 may send a motion detected message 151 to the remote server 126. In response to receiving the motion detected message 151, the remote server 126 may send a motion sound message 153 to the doorbell sound output device 132, that instructs the device application 142 to control the speaker 136 to generate a third audio tone 141 to indicate the detected motion at the doorbell 102. However, when the communication analyzer 114 detects that communication between the doorbell 102 and the remote server 126 is unavailable (or when the remote server 126 is unresponsive), the communication analyzer 114 may generate and broadcast, via the WLAN 120, a motion broadcast message 155 with a second bit pattern 119, different from the first bit pattern 118. Upon receiving and matching the motion broadcast message 155 to the second bit pattern 119, the device application 142 may control the speaker 136 to generate the third audio tone 141 to indicate that motion is detected by the doorbell 102. Advantageously, the doorbell sound output device 132 may generate the third audio tone 141 to indicate the detected motion even when communication between the doorbell 102 and the remote server 126 is unavailable (and/or when the remote server 126 is unresponsive).

In certain embodiments, in response to receiving the motion broadcast message 155 and matching the second bit pattern 119, the device application 142 may control the speaker 136 to generate a fourth audio tone 143 that is different from the third audio tone 141. That is, the second bit pattern 119 may instruct the doorbell sound output device 132 to generate the fourth audio tone 143. Accordingly, the doorbell sound output device 132 generates the third audio tone 141 in response to receiving the motion sound message 153 from the remote server 126, and generates the fourth audio tone 143 in response to receiving the motion broadcast message 155 and matching the second bit pattern 119. When the user hears the fourth audio tone 143, the user is made aware that there is motion in front of the doorbell 102, and is also made aware that communication between the doorbell 102 and the remote server 126 is unavailable. Advantageously, this indication may allow the user to investigate a cause of the communication unavailability and to initiate remediation when appropriate. In certain embodiments, the third and fourth audio tones 141, 143 may be stored as digital audio in the memory 140 and played thorough the speaker 136 by the device application 142.

FIG. 1D shows the motion broadcast message 155 of FIG. 1C further including an instruction 157, in an embodiment. The instruction 157 may be set by the device application 112 of the doorbell 102 to control which of the third and fourth audio tones 141, 143 the doorbell sound output device 132 generates. In one example, when the instruction 157 has a value of zero, the device application 142 controls the speaker to generate the third audio tone 141, and when the instruction 157 has a value of one, the device application 142 controls the speaker to generate the fourth audio tone 143. In another example, when the instruction 157 has a value of one, the device application 142 controls the speaker to generate the third audio tone 141, and when the instruction 157 has a value of zero, the device application 142 controls the speaker to generate the fourth audio tone 143.

The embodiments of FIGS. 1A, 1B, 1C and 1D may be combined such that the doorbell 102 and the doorbell sound output device 132 provide notification of both front button presses (e.g., visitors at the doorbell 102) and detected motion (e.g., PIR-based and/or image-based motion detected in front of the doorbell 102) when communication between the doorbell 102 and the remote server 126 is available or unavailable. A similar backup doorbell communication method (e.g., using the broadcast message 154, 155 broadcast via the WLAN 120 when communication via the network 124 is unavailable) may be used to instruct the doorbell sound output device 132 to generate sounds for other uses without departing from the scope of the embodiments described herein.

Figure 1E:
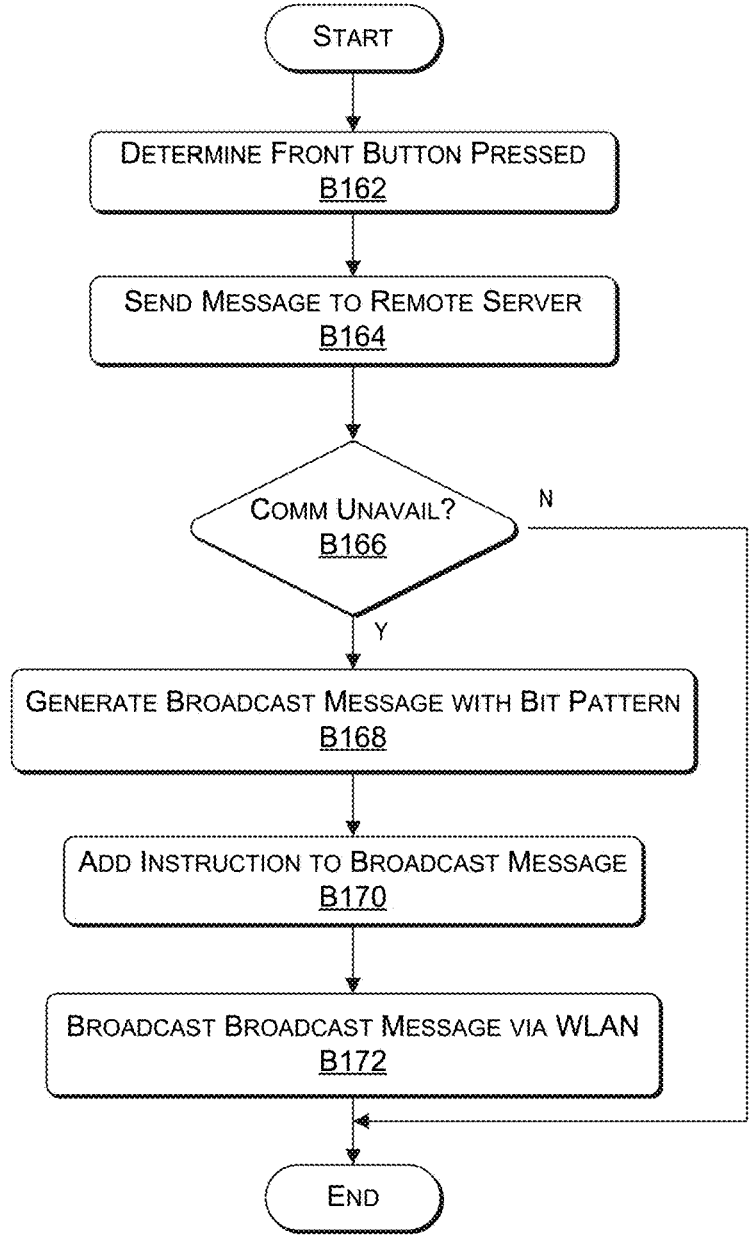
FIGS. 1E and 1F are flowcharts illustrating example backup doorbell communication methods, according to various aspects of the present disclosure.

FIG. 1E is a flowchart illustrating one backup doorbell communication method 160, according to various aspects of the present disclosure. In some embodiments, the method 160 may be implemented in the device application 112 of the doorbell 102, and/or, more particularly, within the communication analyzer 114.

In block B162, a determination is made that a front button of the doorbell has been pressed. In one example of block B162, the device application 112 detects operation of a switch connected to the front button 106 of the doorbell 102. In block B164, a message is sent to a remote server indicating the front button press. In one example of block B164, the device application 112 sends the message 150 to the remote server 126 via the WLAN 120 and the network 124. In another example of block B164, the device application 112 may interact with the wireless hub 122 and learn that the WLAN 120 has no Internet connection.

Block B166 is a decision. If, in block B166, it is determined that communication with the remote server 126 is unavailable, the method 160 continues with block B168; otherwise the method 160 terminates. In one example of block B166, the communication analyzer 114 determines that the communication between the doorbell 102 and the remote server 126 is unavailable when the remote server 126 does not acknowledge the message 150 (FIG. 1A).

In block B168, a broadcast message with a bit pattern is generated. In one example of block B168, the communication analyzer 114 generates the broadcast message 154 to include the first bit pattern 118 (FIG. 1B).

Block B170 is included in certain embodiments. When included, in block B170, an instruction is added to the broadcast message. In one example of block B170, the communication analyzer 114 adds the instruction 156 to the broadcast message 154 (FIG. 1B) to indicate that the second audio tone 139 should be generated by the doorbell sound output device 132. In block B172, the broadcast message is broadcast via the WLAN. In one example of block B172, the communication analyzer 114 sends the broadcast message 154 to the wireless hub 122 for broadcast over the WLAN 120. The method 160 then terminates.

In alternative embodiments, the unavailability of communication between the doorbell 102 and the remote server 126 may be known before the front button of the doorbell is pressed at block B162. For example, the communication analyzer 114 may determine that the communication between the doorbell 102 and the remote server 126 is unavailable because there are no received acknowledgements, from the remote server 126, of status messages routinely transmitted (e.g., every thirty seconds) to the remote server 126. In such embodiments, the method 160 may omit block B164, since the doorbell 102 is already aware of the communication unavailability.

Figure 1F:
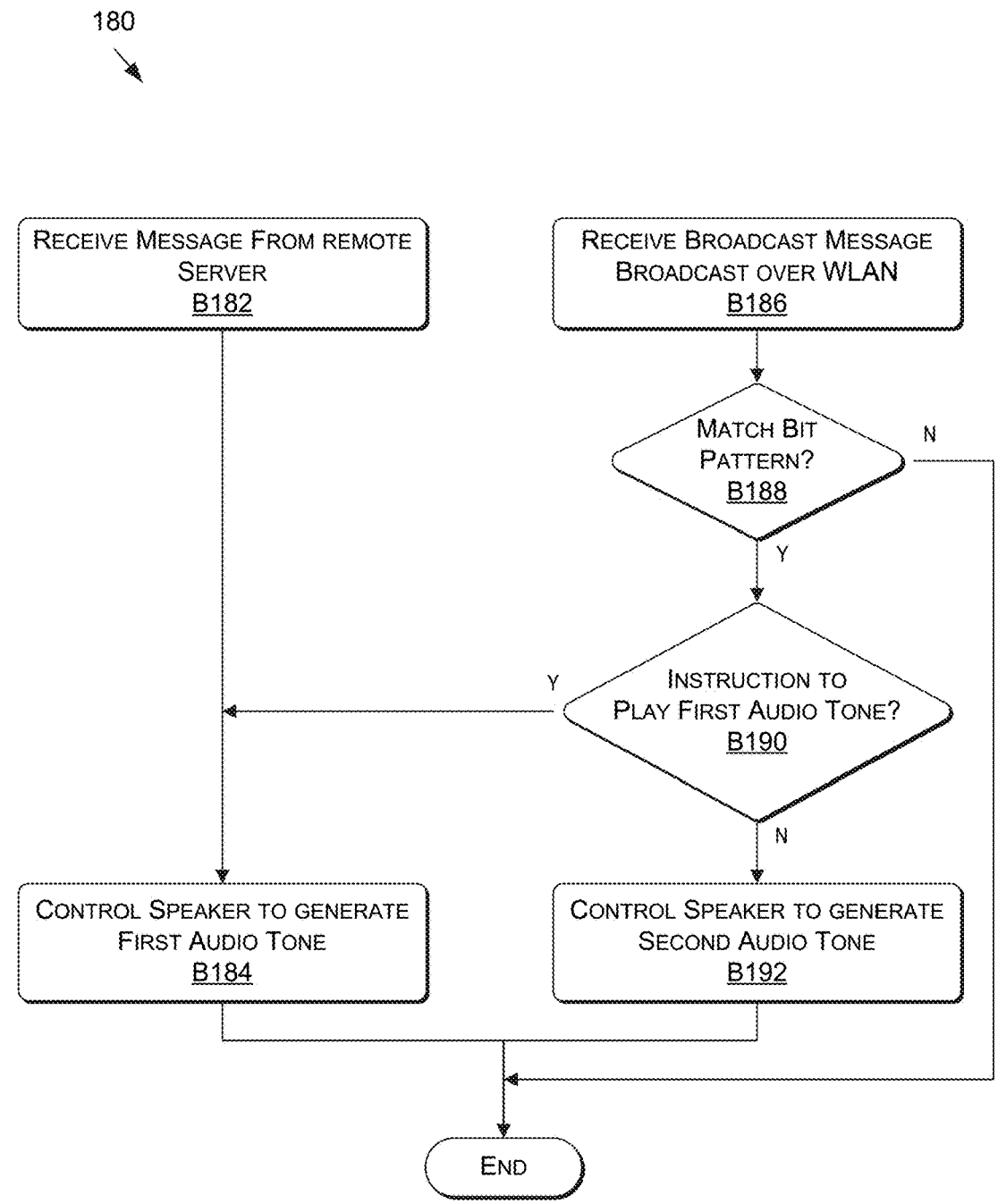

FIG. 1F is a flowchart illustrating one backup doorbell communication method 180, according to various aspects of the present disclosure. In some embodiments, the method 180 may be implemented in the device application 142 of the doorbell sound output device 132. The method 180 starts with either block B182 or block B186, depending upon whether a message is received from the remote server or a broadcast message is broadcast over the WLAN.

The method 180 starts with block B182 when a message is received from the remote server. In one example of block B182, the device application 142 receives the message 152 from the remote server 126 (FIG. 1C), instructing the doorbell sound output device 132 to play the first audio tone 137. In block B184, the speaker is controlled to generate the first audio tone. In one example of block B184, the device application 142 controls the speaker 136 to generate the first audio tone 137. The method 180 then terminates.

The method 180 starts with block B186 when a broadcast message is broadcast over the WLAN. In one example of block B186, the device application 142 receives the broadcast message 154 via the WLAN 120. Block B188 is a decision. If, in block B188 the broadcast message matches a bit pattern, the method 180 continues with block B190; otherwise the method 180 terminates. In one example of block B188, the device application 142 matches the broadcast message 154 to the first bit pattern 118 (FIG. 1A).

Block B190 is a decision. If, in block B190, it is determined that the broadcast message includes an instruction to play the first audio tone, the method 180 continues with block B184; otherwise the method 180 continues with block B192. In one example of block B190, the device application 142 determines that the instruction 156 in the broadcast message 154 indicates that the device application 142 should play the first audio tone 137.

In block B192, the speaker is controlled to generate the second audio tone. In one example of block B192, the device application 142 controls the speaker 136 to play the second audio tone 139. The method 180 then terminates until, for example, a next message 152 is received from the remote server 126 or a broadcast message 154 is received via the WLAN.

In an alternative embodiment, the doorbell 102 includes a wireless transmitter 111 configured to transmit a direct signal 109 using a protocol that is different from the protocol used by the WLAN transceiver 104. In this embodiment, the doorbell sound output device 132 includes a receiver 133 configured to receive the direct signal 109 from the doorbell 102. When the communication analyzer 114 determines that the communication with the remote server 126 is unavailable, the device application 112 may thus control the wireless transmitter 111 to transmit the direct signal 109 when detecting that the front button 106 has been pressed. The doorbell sound output device 132 may receive the direct signal 109 from the doorbell 102, using the receiver 133, and control the speaker 136 to generate one of the first tone 137 or the second tone 139. In certain embodiments, the transmitter 111 and the receiver 133 are each transceivers that communicate using the Bluetooth protocol (or any other short-range wireless protocol) for the direct signal 109.

Figure 2:
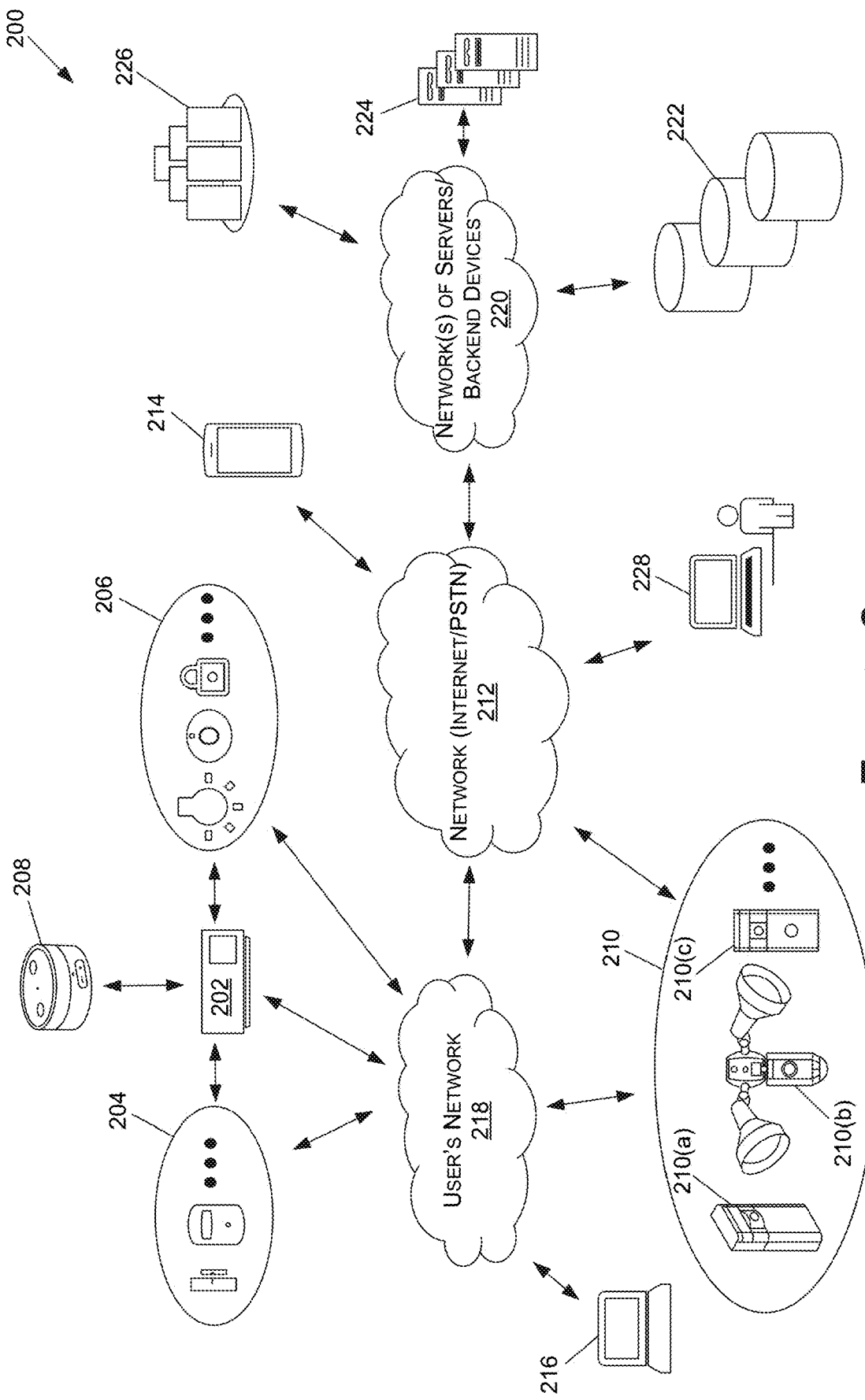
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212 (which may be similar to, and represent the network 124 of FIGS. 1A and 1C), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (which may represent, and/or be similar to, the doorbell 102 of FIGS. 1A and 1C). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

The network 124 of FIGS. 1A and 1B may include similar components and functionality as the network 212 (and/or 218 and/or 220), the remote server 126 may include similar components and functionality as the network devices 222, 224, and 226, the doorbell 102 may include similar components and functionality as the A/V devices 210, and the wireless hub 122 may include similar component and functionality as the smart-home hub device 202.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri® For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216. The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices." The remote server 126 of FIGS. 1A and 1C may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
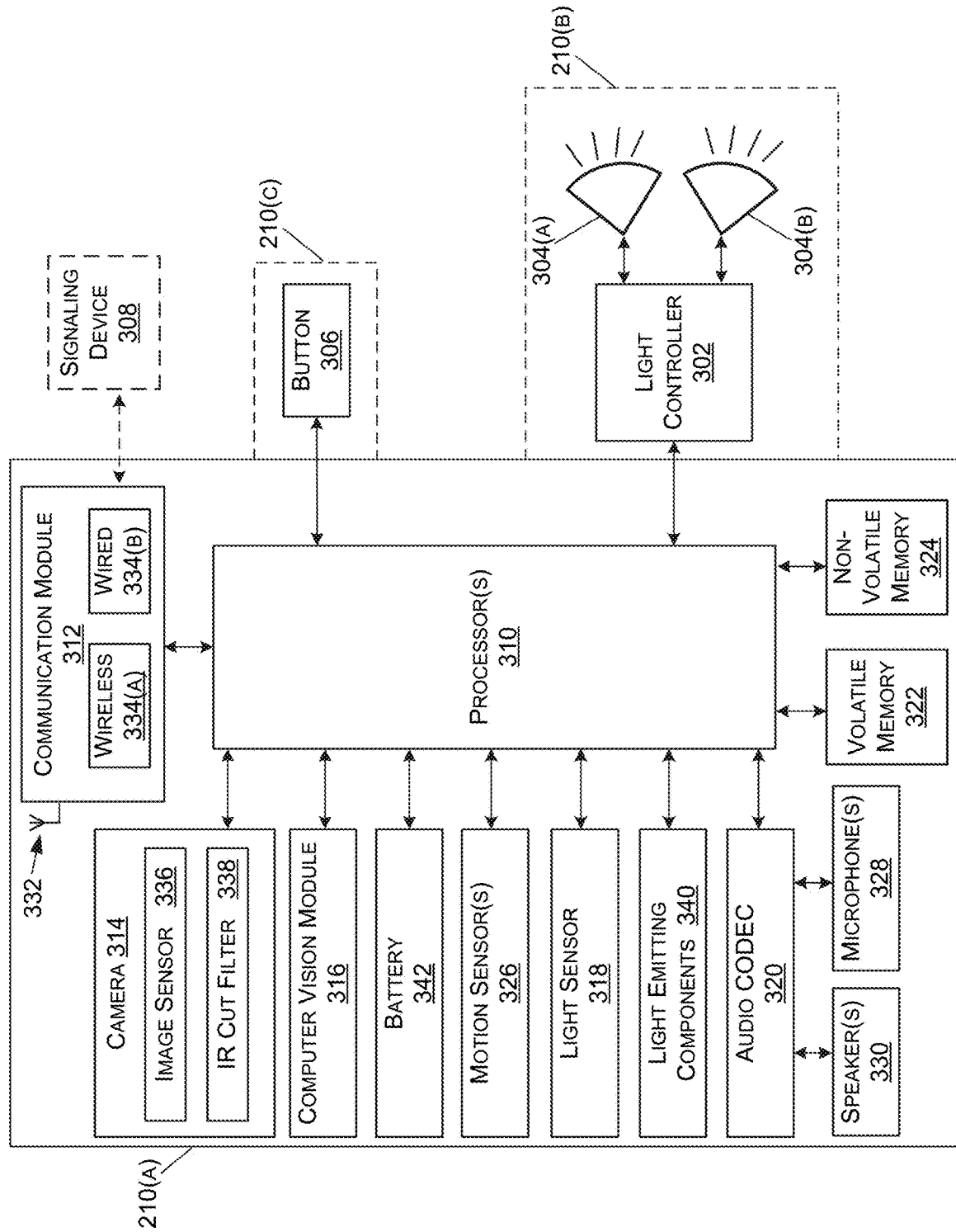
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(*a*). In other embodiments, the one or more A/V devices 210 may include the light camera 210(*b*), which may include some or all of the components of the security camera 210(*a*) in addition to a light controller 302 and one or more lights 304(*a*), 304(*b*). In some embodiments, the one or more A/V devices 210 may include the video doorbell 210(*c*), which may include some or all of the components of the security camera 210(*a*) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(*a*), 304(*b*) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(*a*), 304(*b*). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(*c*), the A/V device 210 may include the button 306. In embodiments where the button 306 is a mechanical button (e.g., has a range of movement), the button 306 may make contact with a button actuator located within the video doorbell 210(*c*) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(*c*), such as transmitting an output signal, using the communication module 312, to the signaling device 308 to cause the signaling device 308 to output a sound (e.g., via the wired 334(*b*) connection to the signaling device 308 and/or a wireless 334(*a*) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
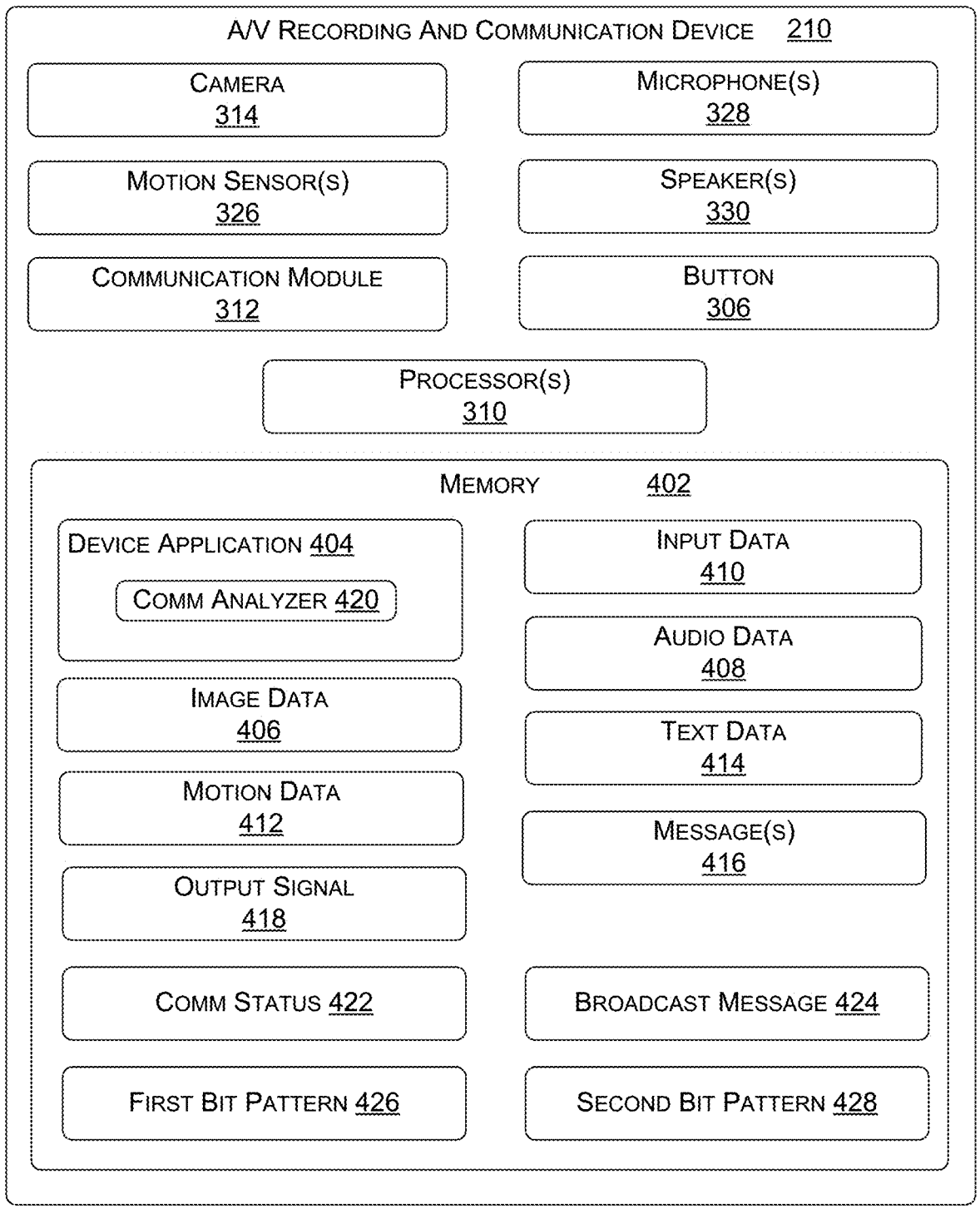
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(*c*), the A/V recording and communication security camera 210(*a*), and/or the floodlight controller 210(*b*). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(*c*)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210.

The A/V device 210 may also include a communication analyzer 420, within the device application 404 for example, that has similar functionality to the communication analyzer 114 of FIGS. 1A and 1C. The memory 402 may also store a communication status 422 that is similar to the communication status 116 of FIGS. 1A and 1B, a broadcast message 424 that is similar to the broadcast message 154, a first bit pattern 426 that is similar to the first bit pattern 118, and a second bit pattern 428 that is similar to the second bit pattern 119.

Figure 5:
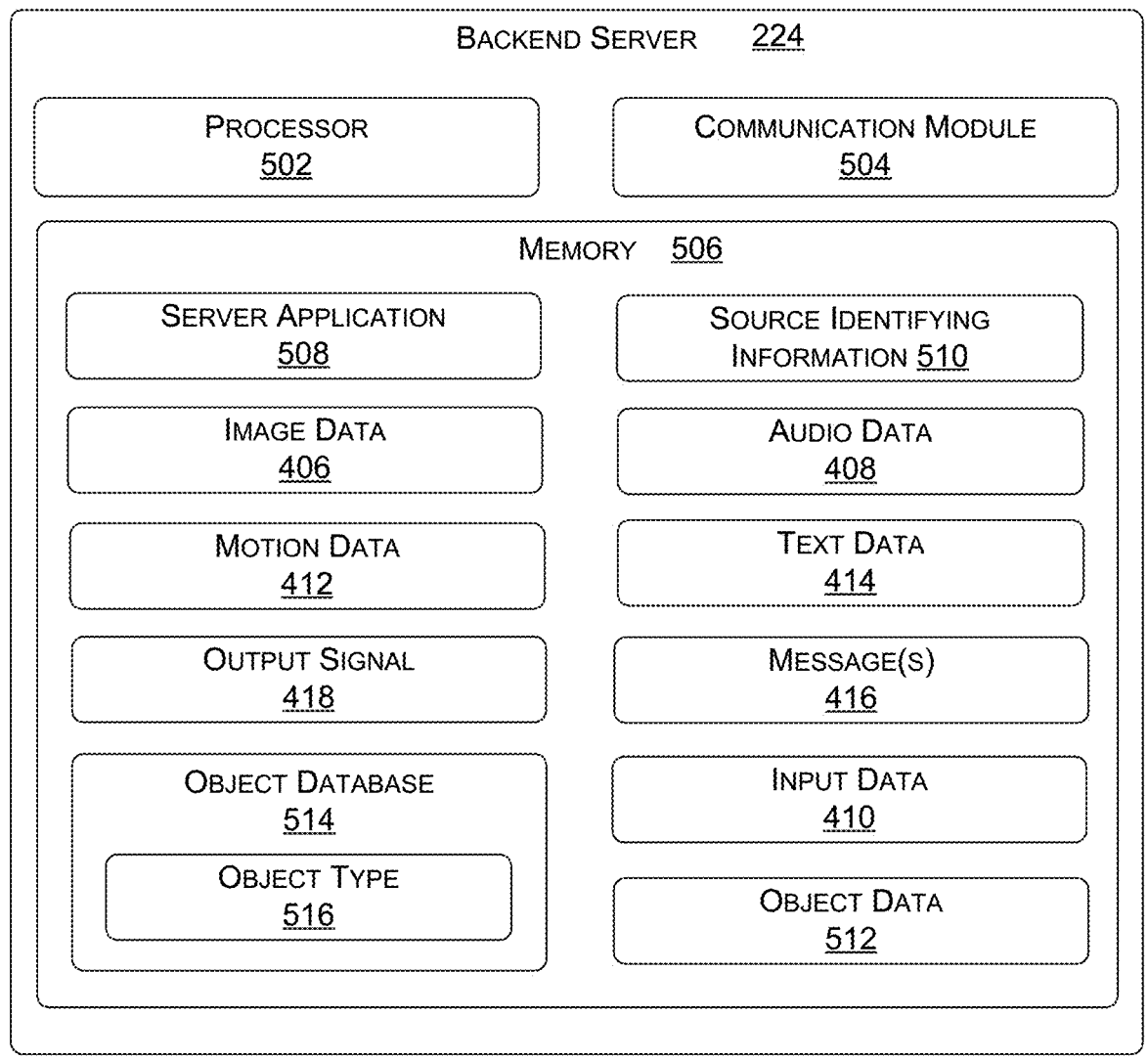
FIG. 5 is a functional block diagram illustrating one example embodiment of a backend device according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 210.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the backend server 224.

Although described as being performed in the backend server 224, in some embodiments, the image data 406 may be analyzed by any of the A/V recording and communication device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

The hub device 202 and/or the backend server 224 (and/or one or more additional or alternative components of the network(s) of servers/backend devices 220) may alternatively be referred to herein as "network devices."

Figure 6:
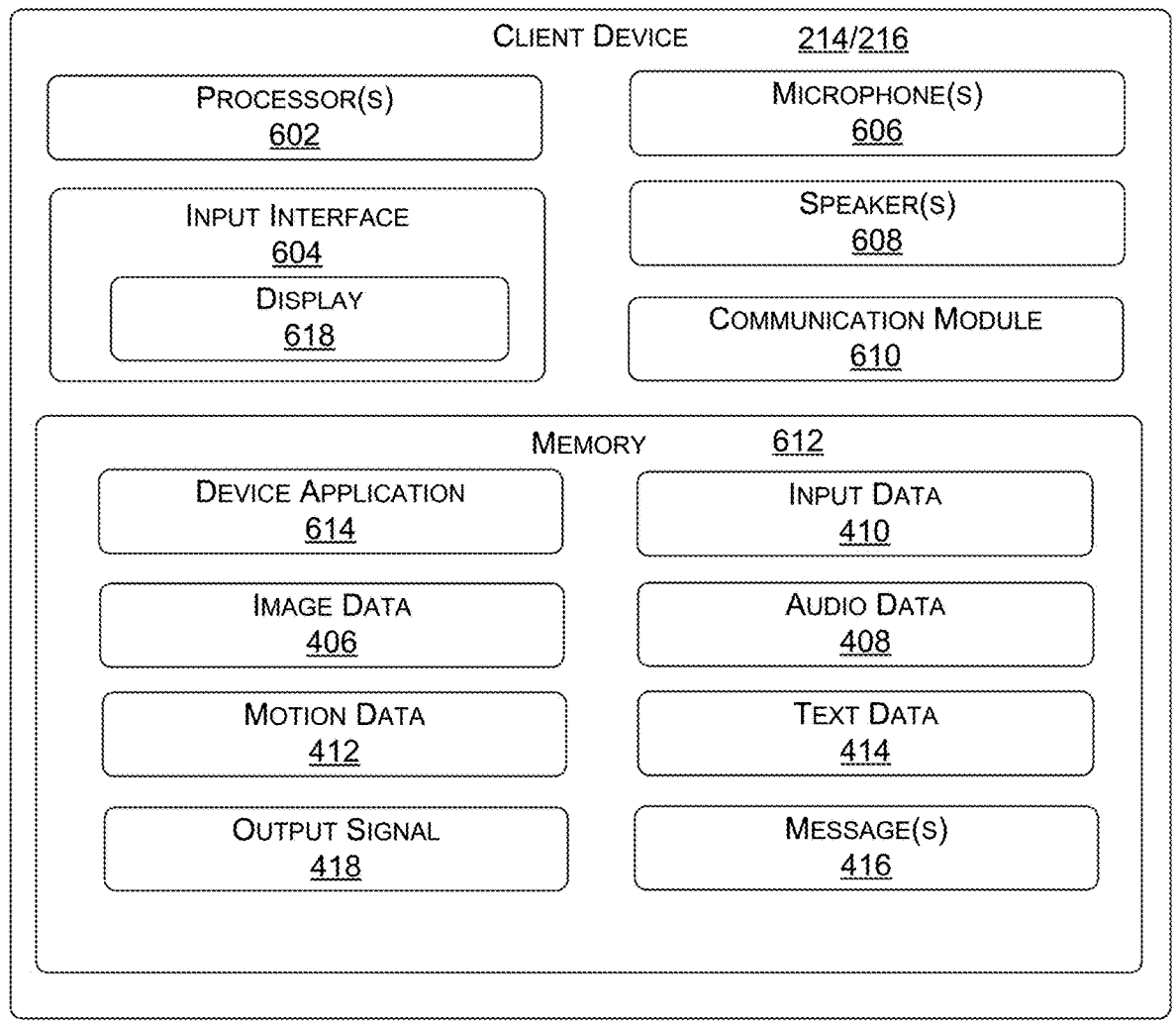
FIG. 6 is a functional block diagram illustrating one example embodiment of a client device according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604. In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618. In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216.

As described herein, at least some of the processes of the A/V device 210, the backend server 224, and/or the client device 214, 216 may be executed by the hub device 202.

Each of the processes/methods described herein, including the methods 160 and 180 of FIGS. 1E and 1F, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

One aspect of the present embodiments includes the realization that a video doorbell 102 always communicates with a remote server 126, and that when the remote server 126 is unavailable, a doorbell sound output device 132 may not generate a sound when a visitor presses a front button 106 of the video doorbell 102. The present embodiments solve this problem by detecting, within the video doorbell 102, when communication between the video doorbell 102 and the remote server 126 is unavailable, and by providing a backup doorbell communication system 100 and method 160/180 that allows the video doorbell 102 to indicate to the doorbell sound output device 132, via a local area network 120, that there is a visitor at the video doorbell 102 such that the doorbell sound output device 132 may generate a tone 137 to indicate the presence of the visitor. Advantageously, this process of providing the backup doorbell communication system 100 and method 160/180 further improves reliability of the video doorbell 102 and the doorbell sound output device 132.

Another aspect of the present embodiments includes the realization that a user may be unaware when communication between the video doorbell 102 and the remote server 126 is unavailable. The present embodiments solve this problem by causing the doorbell sound output device 132 to generate two different audio tones 137, 139; a first audio tone 137 when a message 152 is received from the remote server 126 to indicate the presence of the visitor at the video doorbell 102, and a second audio tone 139, different from the first audio tone 137, when an indication of the visitor at the video doorbell is receive by a backup doorbell communication system 100 and method 160/180. Advantageously, when the user hears the second audio tone 139, the user is aware of the visitor at the video doorbell 102 and also made aware that communication between the video doorbell 102 and the remote server 126 is unavailable.

Figure 7:
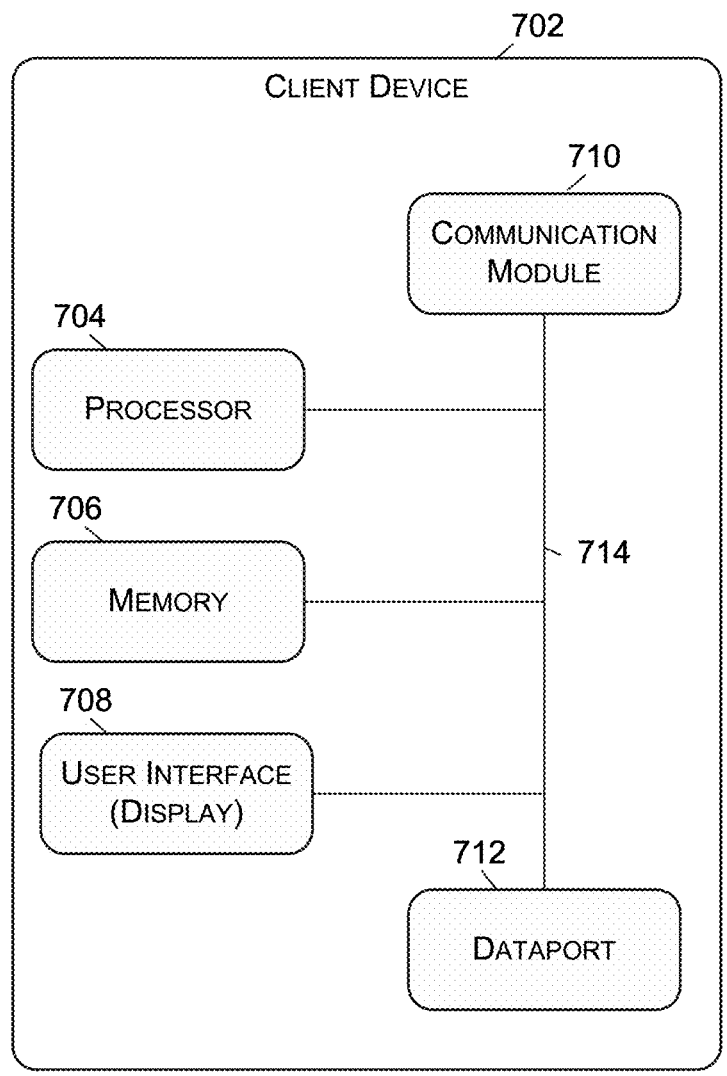
FIG. 7 is a functional block diagram of a client device on which the present embodiments may be implemented according to various aspects of the present disclosure.

FIG. 7 is a functional block diagram of a client device 702 on which the present embodiments may be implemented according to various aspects of the present disclosure. The client device(s) 214, 216 described with reference to FIG. 2 may include some or all of the components and/or functionality of the client device 702. The client device 702 may comprise, for example, a smartphone.

With reference to FIG. 7, the client device 702 includes a processor 704, a memory 706, a user interface 708, a communication module 710, and a dataport 712. These components are communicatively coupled together by an interconnect bus 714. The processor 704 may include any processor used in smartphones and/or portable computing devices, such as an ARM processor (a processor based on the RISC (reduced instruction set computer) architecture developed by Advanced RISC Machines (ARM)). In some embodiments, the processor 2004 may include one or more other processors, such as one or more conventional microprocessors, and/or one or more supplementary co-processors, such as math co-processors.

The memory 706 may include both operating memory, such as random-access memory (RAM), as well as data storage, such as read-only memory (ROM), hard drives, flash memory, or any other suitable memory/storage element. The memory 706 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 704 and the memory 706 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 704 may be connected to the memory 706 via the dataport 712.

The user interface 708 may include any user interface or presentation elements suitable for a smartphone and/or a portable computing device, such as a keypad, a display screen, a touchscreen, a microphone, and a speaker. The communication module 710 is configured to handle communication links between the client device 702 and other, external devices or receivers, and to route incoming/outgoing data appropriately. For example, inbound data from the dataport 712 may be routed through the communication module 710 before being directed to the processor 704, and outbound data from the processor 704 may be routed through the communication module 710 before being directed to the dataport 712. The communication module 710 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 712 may be any type of connector used for physically interfacing with a smartphone and/or a portable computing device, such as a mini-USB port or an IPHONE®/IPOD® 30-pin connector or LIGHTNING® connector. In other embodiments, the dataport 712 may include multiple communication channels for simultaneous communication with, for example, other processors, servers, and/or client terminals.

The memory 706 may store instructions for communicating with other systems, such as a computer. The memory 706 may store, for example, a program (e.g., computer program code) adapted to direct the processor 704 in accordance with the present embodiments. The instructions also may include program elements, such as an operating system. While execution of sequences of instructions in the program causes the processor 704 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 8:
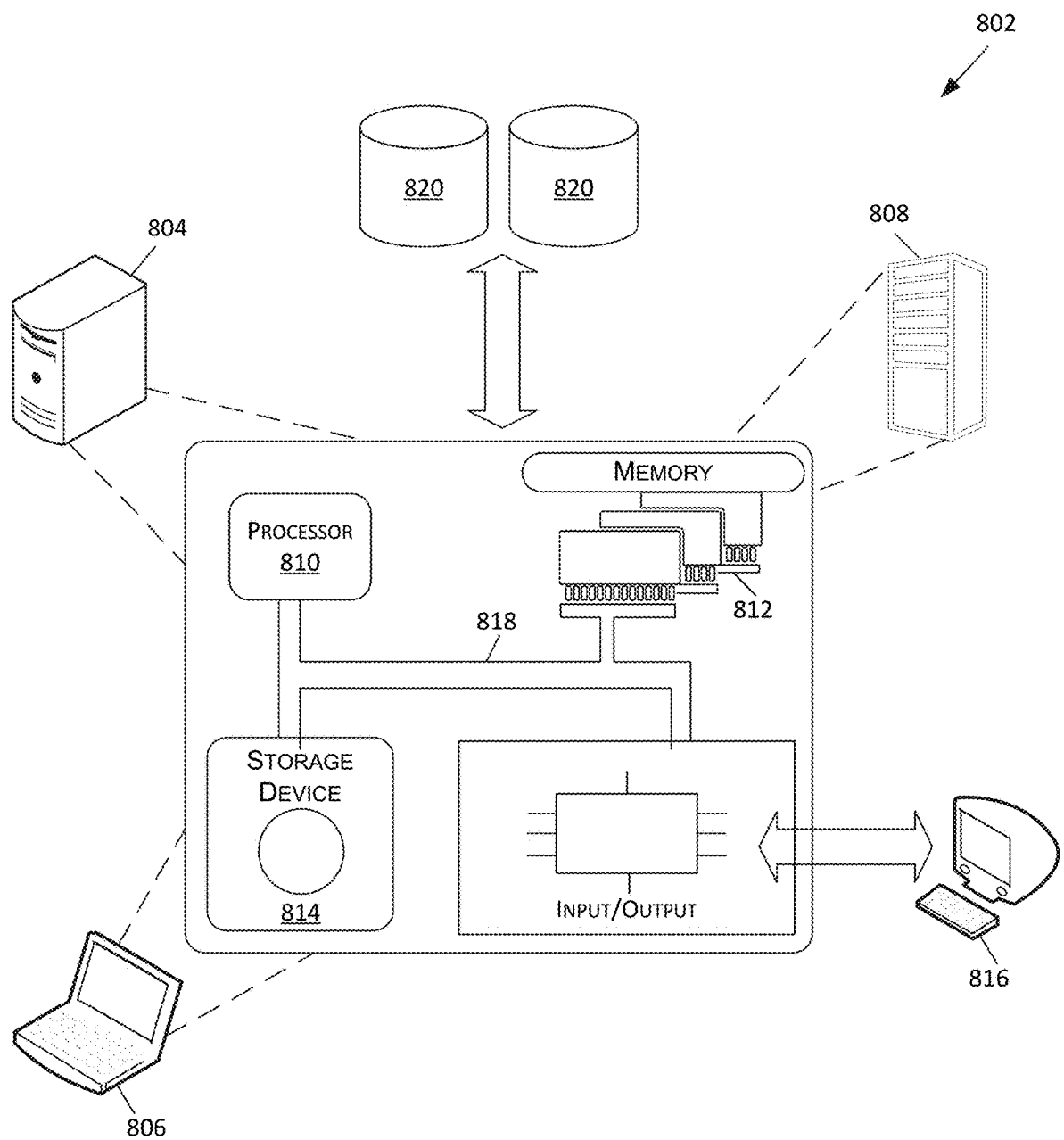
FIG. 8 is a functional block diagram of a general-purpose computing system on which the present embodiments may be implemented according to various aspects of present disclosure.

FIG. 8 is a functional block diagram of a general-purpose computing system on which the present embodiments may be implemented according to various aspects of the present disclosure. The computer system 802 may be embodied in at least one of a personal computer (also referred to as a desktop computer) 804, a portable computer (also referred to as a laptop or notebook computer) 806, and/or a server 808 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 802 may execute at least some of the operations described above. The computer system 802 may include at least one processor 810, memory 812, at least one storage device 814, and input/output (I/O) devices 816. Some or all of the components 810, 812, 814, 816 may be interconnected via a system bus 818. The processor 810 may be single- or multi-threaded and may have one or more cores. The processor 810 execute instructions, such as those stored in the memory 812 and/or in the storage device 814. Information may be received and output using one or more I/O devices 816.

The memory 812 may store information, and may be a computer-readable medium, such as volatile or non-volatile memory. The storage device(s) 814 may provide storage for the system 802 and, in some embodiments, may be a computer-readable medium. In various aspects, the storage device(s) 814 may be a flash memory device, a hard disk device, an optical disk device, a tape device, or any other type of storage device.

The I/O devices 816 may provide input/output operations for the system 802. The I/O devices 816 may include a keyboard, a pointing device, and/or a microphone. The I/O devices 816 may further include a display unit for displaying graphical user interfaces, a speaker, and/or a printer. External data may be stored in one or more accessible external databases 820.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A backup doorbell communication method for communicating between a video doorbell and a doorbell sound output device when communication between the video doorbell and a remote server fails, the video doorbell and the doorbell sound output device both being located at the same site and communicatively connected to a wireless local area network (WLAN) at the site, the method comprising:
    detecting that a front button of the video doorbell has been pressed;
    in response to the detecting, attempting to send a message to the remote server via the WLAN and the Internet;
    in response to determining, at the video doorbell, that the message was not received by the remote server, sending, from the video doorbell via the WLAN, a packet to the doorbell sound output device, the packet identifiable as being from the video doorbell, the packet including an instruction to play an audio tone; and
    generating the audio tone in response to the instruction, by the doorbell sound output device.

2. The backup doorbell communication method of claim 1, further comprising determining that the message was not received by the remote server because the WLAN is not connected to the Internet.

3. The backup doorbell communication method of claim 1, further comprising determining that the message was not received by the remote server because no acknowledgement was received from the remote server.

4. A backup doorbell communication method, comprising:
    detecting a button press at a video doorbell; and
    in response to determining, at the video doorbell, that communication between the video doorbell and a remote server via a wireless local area network (WLAN) is unavailable, sending a broadcast message from the video doorbell via the WLAN to a sound output device, wherein the broadcast message includes an instruction to the sound output device to emit sound indicating the button of the video doorbell has been pressed;

wherein the video doorbell and the sound output device are both located at the same site and communicatively connected to the WLAN at the site.

5. The backup doorbell communication method of claim 4, wherein detecting the button press comprises detecting operation of a switch indicating that a front button of the video doorbell has been pressed.

6. The backup doorbell communication method of claim 5, wherein the broadcast message further includes an instruction to the sound output device to emit sound indicating communication between the video doorbell and the remote server is unavailable.

7. The backup doorbell communication method of claim 4, wherein the broadcast message is broadcast via the WLAN and not specifically addressed to the sound output device.

8. The backup doorbell communication method of claim 4, the determining that communication between the video doorbell and the remote server via the WLAN is unavailable comprising:
sending, in response to detecting the button press, a message to the remote server via the WLAN; and
determining that a response to the message is not received from the remote server thereby indicating that the communication between the video doorbell and the remote server via the WLAN is unavailable.

9. The backup doorbell communication method of claim 4, further comprising:
determining that the WLAN is not connected to the Internet; and
determining that the communication between the video doorbell and the remote server via the WLAN is unavailable because the WLAN is not connected to the Internet.

10. The backup doorbell communication method of claim 4, further comprising detecting motion of an object in front of the video doorbell, wherein the broadcast message includes an instruction to the sound output device to emit sound indicating movement of the object at the video doorbell.

11. The backup doorbell communication method of claim 10, wherein the motion is detected by a motion detector of the video doorbell.

12. The backup doorbell communication method of claim 10, wherein detecting the motion comprises processing images from a camera of the video doorbell.

13. The backup doorbell communication method of claim 10, wherein detecting the motion comprises processing infrared signals from a pyroelectric infrared detector of the video doorbell.

14. A doorbell, comprising:
a processor;
a wireless local area network (WLAN) transceiver communicatively coupled with the processor;
at least one detector communicatively coupled with the processor; and
a memory, communicatively coupled with the processor, storing machine readable instructions that, when executed by the processor, control the doorbell to:
receive a signal indicating input detected by the at least one detector;
determine when communication between the doorbell and a remote server via the WLAN transceiver is unavailable; and
in response to determining when communication between the doorbell and the remote server via the WLAN transceiver is unavailable, broadcast a broadcast message, identifiable by a sound output device located at a same site as the doorbell, via the WLAN transceiver over a WLAN, wherein the broad cast message directs the sound output device to generate a sound to indicate one or both of (a) that the front button of the doorbell has been pressed, and (b) that the motion is detected in front of the doorbell.

15. The doorbell of claim 14, wherein the broadcast message is broadcast over the WLAN and not specifically addressed to the sound output device.

16. The doorbell of claim 14, the at least one detector comprising one or more of a switch configured to close when a front button of the doorbell is pressed, a pyroelectric infrared detector configured to generate an output signal processable by the processor to determine motion in front of the doorbell, and a camera configured to capture images processable by the processor to determine motion in front of the doorbell.

17. The doorbell of claim 16, the memory further comprising machine readable instructions stored in the memory that, when executed by the processor, control the doorbell to:
send an activity message to the remote server via the WLAN transceiver to indicate one or both of (a) that the front button of the doorbell has been pressed, and (b) that the motion is detected in front of the doorbell; and
determine that a response to the activity message is not received from the remote server indicating that the communication between the doorbell and the remote server is unavailable because the response is not received.

18. The doorbell of claim 14, further comprising machine readable instructions stored in the memory that, when executed by the processor, control the doorbell to determine that the WLAN is not connected to the Internet, and determine that the communication between the doorbell and the remote server is unavailable because the WLAN is not connected to the Internet.

* * * * *